United States Patent
Dormegnie et al.

(10) Patent No.: US 6,836,706 B2
(45) Date of Patent: Dec. 28, 2004

(54) METHOD OF FORECASTING COMFORT INSIDE A VEHICLE EQUIPPED WITH A MOUNTED ASSEMBLY HAVING NON-UNIFORMITIES

(75) Inventors: Eric Dormegnie, Clermont-Ferrand (FR); Pierre Fabry, Clermont-Ferrand (FR)

(73) Assignee: Michelin Recherche et Technique S.A., Granger-Paccot (CH)

(*) Notice: Subject to any disclaimer, the term of this patent is extended or adjusted under 35 U.S.C. 154(b) by 0 days.

(21) Appl. No.: 10/609,881

(22) Filed: Jun. 30, 2003

(65) Prior Publication Data

US 2004/0065145 A1 Apr. 8, 2004

Related U.S. Application Data

(63) Continuation of application No. PCT/EP01/15045, filed on Dec. 19, 2001.

(30) Foreign Application Priority Data

Jan. 12, 2001 (FR) .............................................. 01 00556

(51) Int. Cl.⁷ .............................................. G01M 17/07
(52) U.S. Cl. ............................ 701/1; 701/36; 381/71.4; 280/5.515; 73/146
(58) Field of Search ...................... 701/1, 36; 381/71.2, 381/71.4, 73.1; 73/146, 587; 280/5.515

(56) References Cited

U.S. PATENT DOCUMENTS

| | | | | |
|---|---|---|---|---|
| 3,989,780 A | * | 11/1976 | Vorih | 264/40.1 |
| 4,178,199 A | * | 12/1979 | Lippman et al. | 29/894.37 |
| 5,586,028 A | * | 12/1996 | Sekine et al. | 701/1 |
| 5,629,986 A | * | 5/1997 | Shoureshi | 381/71.12 |
| 5,748,748 A | * | 5/1998 | Fischer et al. | 381/71.4 |
| 5,811,672 A | * | 9/1998 | Mancosu et al. | 73/146 |
| 6,529,838 B1 | * | 3/2003 | Horiuchi et al. | 702/41 |

FOREIGN PATENT DOCUMENTS

| | | | |
|---|---|---|---|
| DE | 10107870 A1 * | 9/2002 | B65G/39/02 |
| EP | 0886130 | 12/1998 | |

* cited by examiner

*Primary Examiner*—Michael J. Zanelli
*Assistant Examiner*—Eric M. Gibson
(74) *Attorney, Agent, or Firm*—Felipe J. Furley; Christopher P. Crecente; Alan Csontos

(57) ABSTRACT

A method of forecasting the comfort performance in a vehicle equipped with a test mounted assembly in a selected position, traveling at speed V over smooth ground, with a maximum speed Vmax, by establishing a vehicle transfer function where the assembly has a tire with N substantially identical irregularities on its circumference, regularly distributed to excite the vehicle in a range of frequencies, measuring the forces at the wheel center, and multiplying the forces by the vehicle transfer function to forecast the noise and vibrations.

10 Claims, 3 Drawing Sheets

METHOD OF FORECASTING COMFORT INSIDE A VEHICLE EQUIPPED WITH A MOUNTED ASSEMBLY HAVING NON-UNIFORMITIES

The present application is a continuation of International Application No. PCT/EP01/15045, filed Dec. 19, 2001, published in French with an English Abstract on Jul. 18, 2002 under PCT Article 21(2), which claims priority to French Patent Application No. 01/00556, filed Jan. 12, 2001.

BACKGROUND OF THE INVENTION

The invention relates to a method of forecasting acoustic and vibrational levels which are obtained inside a vehicle travelling over smooth ground, this vehicle being equipped with mounted assemblies composed of tires mounted on their mounting wheels.

Despite all care taken in the manufacture of the different elements making up an assembly (tire and wheel) and in the assembly thereof before they are mounted on a vehicle, it is known that any mounted assembly has a greater or lesser number of irregularities or non-uniformities when the wheel turns. When the vehicle is travelling, these irregularities or non-uniformities cause vibrational excitation of the different components of a vehicle when the said vehicle is equipped with the said assembly, in ways which may be different and vary in dependence on the speed of the said vehicle.

By non-uniformity of a mounted assembly or a rotating assembly there is meant an irregularity which may be connected among other things with:

one or more faults or irregularities in the distribution of masses or rigidity in the mounted assembly;

eccentric mounting of the wheel on the vehicle;

geometric faults in the wheel;

poor mounting of the tire on its wheel.

These irregularities lead to cyclic variations in the forces on the wheel centers and/or at any other point of attachment of the system connecting the vehicle to the ground. By a system connecting to the ground there is meant a sub-assembly of elements of the vehicle ensuring that the vehicle body is connected to one or more surfaces of contact between the vehicle and the ground. This sub-assembly is determined in advance and comprises for example all the mechanical parts of the vehicle located between at least one fixing point on the body of the said vehicle and at least one footprint of each tire with which the said vehicle is equipped; in this example, at least one tire is included in the system connecting to the ground.

These cyclic variations of forces resulting from the non-uniformities become evident during travel in vibrations of the floor of the vehicle, the seats and the steering wheel. An acoustic disturbance may also occur with noise being created inside the vehicle by the vibrations of different parts of the said vehicle. The level of nuisance perceived depends on the vehicle and the speed of travel (there are also critical speeds, at which the nuisance perceived is at a maximum), but mainly on the level of non-uniformity of the rotating assemblies.

In the text below, "comfort performance" means the acoustic and vibrational level measured inside a given vehicle equipped with a set of mounted assemblies.

Those skilled in the art are familiar with a method of evaluating the comfort performance of a new tire for a given vehicle, in accordance with which noise and vibration measurements are made in the passenger compartment of a vehicle travelling over a section of smooth road, by working through different levels of non-uniformity (for example 10 grams, 20 grams, 30 grams of unbalanced load) for the four mounted assemblies of the vehicle over the entire range of speeds of the vehicle in order to be sure of having evaluated the maximum disturbance. This method requires the vehicle to be available, however, and can only be performed in favorable weather conditions, which gives rise to what is sometimes an excessively long immobilization period and consequently an additional cost. This method is moreover long and laborious for the operator, is subject to large variations in measurement, and is expensive in the implementation phase of a tire for a given vehicle.

SUMMARY OF THE INVENTION

The invention relates to a method of forecasting the comfort performance (level of noise and vibration) which does not have the disadvantages of the method which have just been mentioned.

With this object, there is proposed a method of forecasting the noise and vibrations in the passenger compartment of a vehicle equipped with test mounted assemblies and travelling at a given speed V over smooth ground, this method consisting in multiplying an overall transfer function of the vehicle equipped with reference mounted assemblies by forces resulting at the wheel center of the test mounted assembly, this mounted assembly bearing an identical load to that measured on the vehicle and travelling over the same ground. The method proposed includes a first step of determining an overall transfer function of the vehicle by using a reference mounted assembly and a second step in which forces are measured at the wheel center of the test mounted assembly.

By a reference mounted assembly there is meant a mounted assembly used to assess the overall transfer function, this reference mounted assembly being prepared such that it has a number N of irregularities of appropriate dimensions to excite the vehicle in a range of frequencies Fmin, Fmax within the spectrum of speeds selected (Vmin, Vmax). By a test mounted assembly there is meant a mounted assembly whereof the comfort performance is to be forecast for the vehicle, taking into account the non-uniformities this test mounted assembly may have. These mounted assemblies (test and reference) are composed of a wheel provided to be mounted on the vehicle (in accordance with the constructor's specifications) and a tire, also provided to be mounted on the vehicle. As a general rule, the mounting wheel has parts forming seats and parts forming edges, these parts being intended to cooperate with beads of the tire when the latter is mounted on this wheel. Moreover, the tire comprises a tread whereof the radially outer surface is intended to come into contact with the roadway during travel; sidewalls connect the tread to the beads.

Principle of the Method.

There is proposed a method of forecasting the comfort performance (noise and vibrations) in a vehicle equipped with a test mounted assembly in a selected position on a vehicle travelling at a given speed V on a travel medium of the smooth ground type, allowing an equivalent maximum speed Vmax of the vehicle to be attained (Vmax being greater than the given speed V), this test mounted assembly having a greater or smaller number of faults of non-uniformity as mentioned at the beginning of this description.

This method comprises the following steps:

(a)—preparing a reference mounted assembly comprising a tire and its mounting wheel, such that this reference mounted assembly of circumferential length $\pi D$ has a number N of irregularities which are substantially identical and regularly distributed over the circumference of the mounted assembly, these irregularities being selected to excite the vehicle in a range of frequencies from a minimum frequency Fmin to a maximum frequency Fmax in the course of travel over smooth ground, this number N being determined by the formula:

$$N = \text{integer part} \left(\frac{(F\max \times \pi D)}{V\max}\right) + 1$$

where: Fmax is in hertz, D is in meters and Vmax is in meters per second;

(b)—equipping the vehicle with the reference mounted assembly in the selected position on the vehicle;

(c)—positioning the vehicle such that the reference mounted assembly rests on the travel medium capable of causing the said reference mounted assembly to rotate;

(d)—recording the noise and vibrations at at least one point inside the vehicle by working through the speeds of rotation of the reference mounted assembly in a range of speeds of rotation ($\omega$min, $\omega$max) equivalent to the speeds (Vmin, Vmax) of the vehicle, the speed Vmin being defined by the following equation:

$$V\min = \frac{(F\min \times \pi D)}{N}$$

(e)—measuring the resulting forces exerted at the wheel center of the reference mounted assembly, this assembly being mounted to travel either on the travel medium used in step (c) or on a travel medium equivalent to that used in step (c) and put under the conditions of travel (direction of rotation, tire pressure, load, range of speeds of rotation) corresponding to the position selected on the vehicle;

(f)—calculating for this position on the vehicle an overall transfer function between the forces measured at the wheel center of the reference mounted assembly and the noise and vibrations in the vehicle;

(g)—measuring the resulting forces at the wheel center of the test mounted assembly travelling either on the travel medium from step (c) or on a travel medium equivalent to that used in step (c), under conditions of tire pressure and load identical to those used in step (c) at a speed of rotation equivalent to the speed V;

(h)—multiplying the forces obtained in step (g) by the overall transfer function calculated in step (f) to obtain a forecast of the noise and vibrations in the vehicle travelling at speed V, the said vehicle being equipped with the test mounted assembly in the selected position.

By travel medium there is meant an assembly of media allowing a mounted assembly to be put under the appropriate loading condition and the said mounted assembly to be driven in rotation, in particular a testing drum, a roller bench or indeed a testing machine having a flat track passing below the tire of the mounted assembly.

In order to obtain a spectrum extending over the entire range of frequencies selected, the measurements are performed by working through the speeds of rotation of the reference mounted assembly. This working through the speeds may be carried out continuously by accelerating between the minimum speed and the maximum speed or indeed by decelerating between these two speeds; this working through may also be carried out for a plurality of speeds between these minimum and maximum speeds.

One advantage of the present method lies in the fact that the forces involved in determining the overall transfer function and in using it later to characterize a new mounted assembly are effectively the actual forces at the wheel center.

The measurements described in steps (e) and (g) above are provided to be performed at the wheel center of the reference mounted assembly and test mounted assembly; it goes without saying that it is possible to perform them while taking into account not just one mounted assembly but a more complex system including both the said mounted assembly and particular elements connecting the said assembly to the vehicle, as for example suspension elements. In this case, the points where the measurements are made correspond to the points of attachment of these particular elements to the vehicle.

The method fulfils the object, which is to evaluate for a given vehicle the comfort performance of a mounted assembly having a given level of non-uniformity. With the proposed method, it is not necessary to have the vehicle available for each new mounted assembly differing from the reference mounted assemblies, since the overall transfer function of the vehicle is established on a travel medium which is also the travel medium used to measure the forces at the wheel center of the mounted assembly by itself (or at any other point of attachment selected for measurement).

Moreover, and surprisingly, it has been found that it was possible for a given vehicle to go beyond the dimension of the tire. This means that for a vehicle provided to be equipped with different tire dimensions (for example between the front axle and the rear axle), it is possible to determine an overall transfer function which is applicable to all the dimensions accepted by the said vehicle.

By overall transfer function there is meant a function comprising two parts, a first part relating to the noise in the passenger compartment of the vehicle and a second part relating to the vibrations at certain predetermined points in the same passenger compartment. The determination of the overall transfer function is given by using a series of measurements on the vehicle equipped with the reference mounted assembly and a series of measurements on the reference mounted assembly by itself, these measurements corresponding to the measurements as presented in the principle of the method.

In practice, with a single tire and a single wheel, it will be possible to create a plurality of different test mounted assemblies by modifying the mounting of the said tire on its wheel (that is to say the positioning of the tire on its wheel), or the balancing of the assembly (that is to say the distribution of the rotating masses), or indeed the mounting of the assembly on the axle. By means of these modifications, the non-uniformity of the mounted assembly is changed, which can of course be evaluated by recording the forces at the wheel center; use of the method according to the invention results in a forecast of the noise and vibrations in the vehicle resulting from this change.

In order to operate between a zero frequency and the minimum frequency Fmin, an unbalanced load is provided on the reference mounted assembly. After balancing this reference mounted assembly, a particular mass of between 30 and 50 grams is fixed next to the valve, in order to create a dynamic unbalanced load (that is to say a disequilibrium in the distribution of the rotating masses).

First Embodiment of the Irregularities in the Reference Mounted Assembly.

On a tire provided with an initially smooth tread there are made a plurality of substantially identical irregularities distributed regularly over the circumference of the tire tread. These irregularities comprise a series of notches having substantially the same width and a depth between 0.5 and 3 mm; these notches extend over the entire width of the tread. Preferably, the notches form an angle at most equal to 30° with the axis of rotation of the tire.

These indentations may be made by cutting the molded vulcanized tire or by molding in the course of molding the tire.

The number of notches N, defined by the formula below, is a function of the maximum frequency selected and the maximum permitted speed for the vehicle:

$$N = \text{integer part}\left(\frac{(F\max \times \pi D)}{V\max}\right) + 1$$

where: Fmax is in Hz

D is in meters

Vmax is in meters/second.

Preferably, the notches of mean width Le are disposed regularly in the circumferential direction at a mean pitch P, the relationship between the mean width Le and the pitch P being determined by the following equation:

$$0.05 \leq K \leq 5$$

$$\text{where } K = \frac{Le}{P - Le}$$

When this ratio K is less than 0.05, the level of non-uniformity is not sufficient, but when this same ratio is greater than 5, the rigidity of the tread is excessively affected thereby.

Second Embodiment of the Irregularities of the Reference Mounted Assembly.

Another variant consists in positioning on the tread (whether the latter is smooth or sculptured) a series of extra-thick portions extending in the transverse direction (at most 30° with respect to the axial direction of the tire).

Third Embodiment of the Irregularities.

A plurality of N insert blocks of the same width are placed uniformly distributed between an edge of the rim and the tire bead. These insert blocks are from 4 to 6 mm thick and extend in the radial direction over the entire height of the edge. It goes without saying that it is possible to increase the effect of non-uniformity by providing insert blocks on both edges.

Fourth Embodiment of the Irregularities.

A plurality of N insert blocks of the same thickness and the same width are arranged uniformly between at least one of the tire beads and the seat of its mounting wheel.

Fifth Embodiment of the Irregularities.

The rigidity of the carcass reinforcement in the sidewalls of the tire is modified, for example by making N sectors having cuts and strengthened portions in this reinforcement, these N sectors being uniformly distributed in the circumferential direction, while taking care to maintain the leak-tightness of the said tire.

BRIEF DESCRIPTION OF THE DRAWINGS

The method according to the invention is illustrated by the following figures, in which:

In FIG. 1, a partial view of a tread 2 of a size 195/65 R 15 tire 1 with a circumferential length of 1.935 m, intended to be mounted on a mounting wheel to form a reference mounted assembly intended to equip the front left position of a private vehicle whereof the operating speed Vmax is 170 km/h. On the outer surface of the tread of this tire and over its entire width there are made a number N of transverse notches or indentations 3 which are 2.0 mm deep and 96.5 mm wide. The function of these N indentations 3 is to make the vehicle undergo excitations of large amplitude when this vehicle is equipped with this reference mounted assembly, in a range of frequencies from 20 to 290 Hz.

The number N of indentations, in this case equal to 12, is determined as a function of the maximum frequency of the range of analysis, the maximum speed and the circumferential length of the reference assembly. This number N is equal to the integer part of $$\left(\frac{290 \times 1.935}{47}\right)$$

in other words 11, to which 1 is added.

This reference mounted assembly is used to determine a transfer function of the said vehicle by the method according to the invention. To this end, the reference mounted assembly mounted on the vehicle is inflated to its recommended operating pressure (2.1 bar) in order to bear the nominal load of the vehicle; it is then placed on a travel testing drum having a circumferential length of 5 meters and whereof the travel surface is smooth (that is to say it has no relief elements of a height greater than half the depth of the indentations made in the reference assembly tire) and driven in rotation by the said testing drum. Before the measurements are taken, preparatory travel at a speed of substantially half the maximum speed is effected.

Force recorders are positioned at the wheel center of the reference mounted assembly in order to record the variations in forces during travel, and acceleration meters are positioned on the steering wheel of the vehicle and the floor of the said vehicle.

After the preparatory travel, the speed of rotation is increased to one equivalent to a speed of the vehicle equal to the maximum speed. Then, simultaneous capture of the actual speed of rotation and the signals of forces and accelerations is effected during the course of travel on the testing drum, during which the speed is progressively reduced from 170 km/h to 10 km/h in 400 s (which corresponds to a deceleration of approximately 0.4 km/h each second).

To obtain adequate excitations at low frequency (that is to say between 2 and 20 Hz), an unbalanced load is created by attaching a mass of 40 grams to the mounting wheel.

Figure 1:
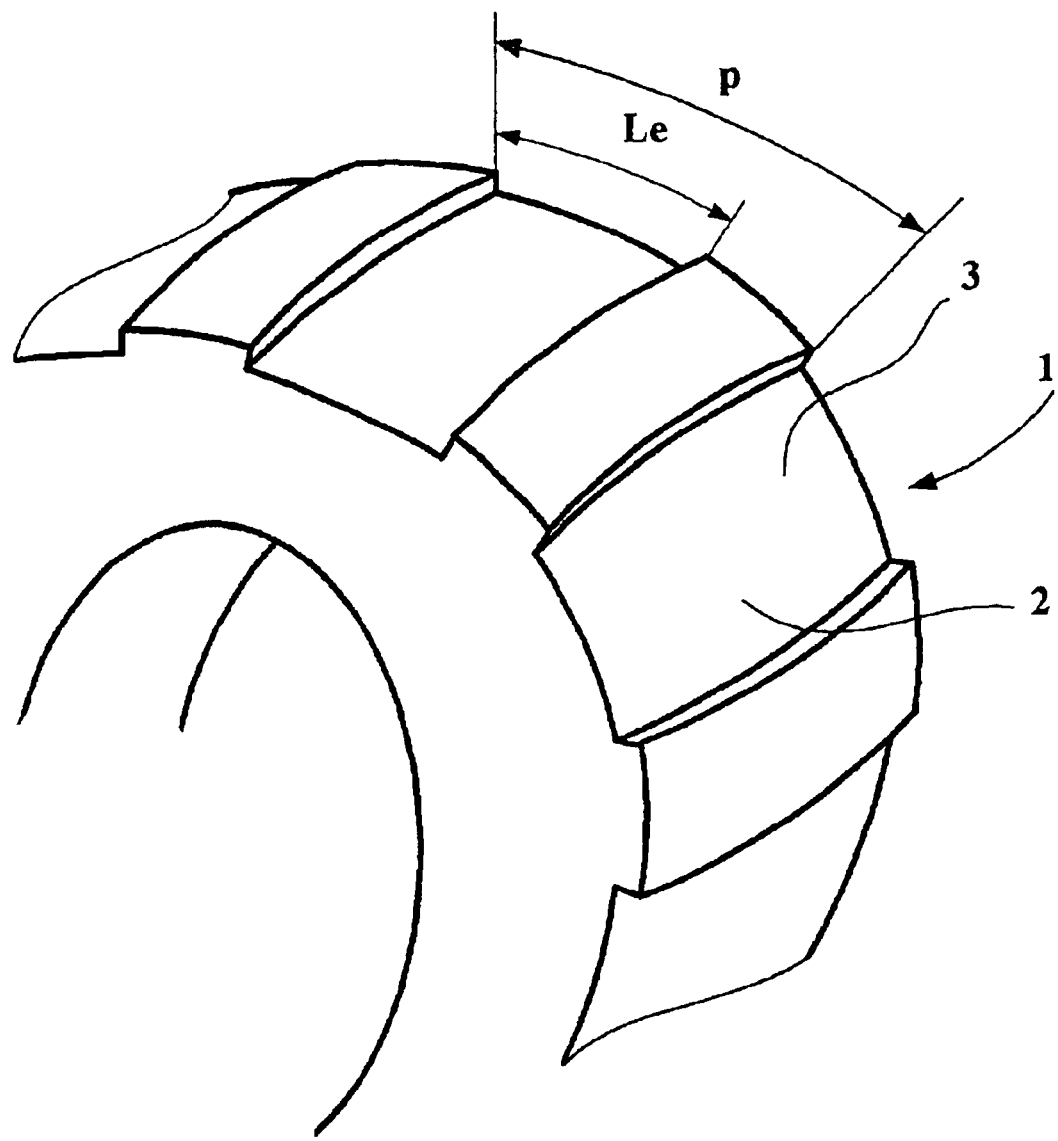
FIG. 1 shows in part a tire forming the reference mounted assembly, provided with a plurality of transverse indentations.
Figure 2:
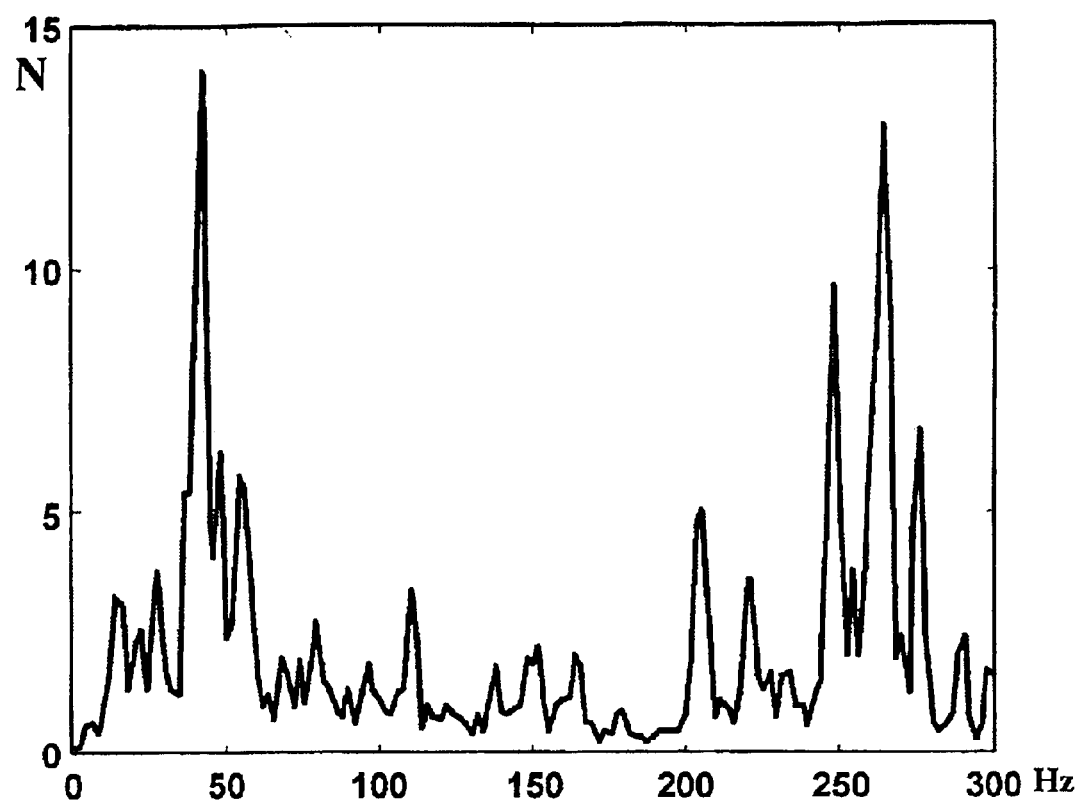
FIG. 2 shows a recording of the forces in the longitudinal direction, applied to the wheel center of the test mounted assembly.
Figure 3:
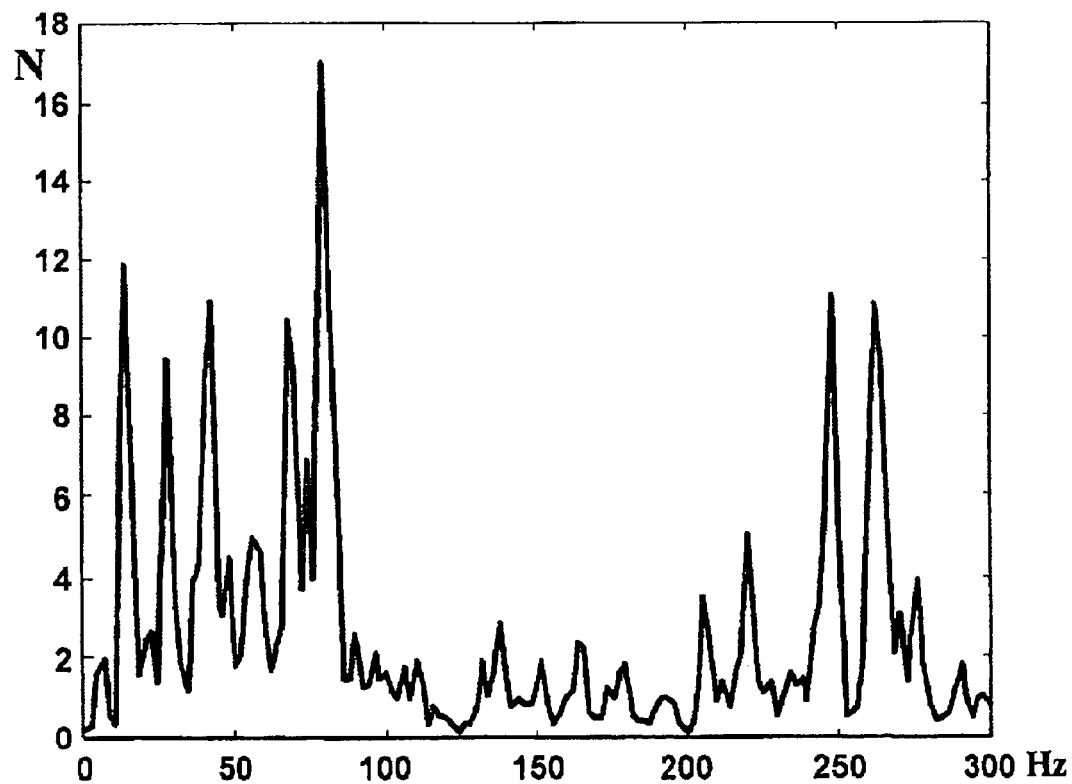
FIG. 3 shows a recording of the forces exerted in the direction perpendicular to the travel medium and applied to the wheel center of the test mounted assembly.

FIG. 2 and FIG. 3 respectively show the forces recorded at the wheel center of the test mounted assembly whereof the impact on the comfort performance is to be forecast for the same vehicle as was used to determine the overall transfer function described above. The x axes correspond to the frequencies, while the y axes correspond to the forces exerted by the test mounted assembly travelling on the same travel medium in conditions of pressure, load and direction of rotation which are identical to the conditions taken for the reference mounted assembly on the vehicle at the selected speed V, in this case equal to 90 km/h.

After having performed measurements at the selected speed of 90 km/h of the forces at the wheel center of the test mounted assembly in a travel test on a medium similar to that used in the preceding steps with the reference mounted assembly and multiplying the forces recorded by the overall transfer function established in the preceding steps, a forecast of the spectrum of accelerations at the steering wheel and the floor of the vehicle at the selected speed is obtained. A comparison is made in FIGS. 4 and 5 of these forecasts with the values obtained by measurements on the vehicle at this speed.

Figure 4:
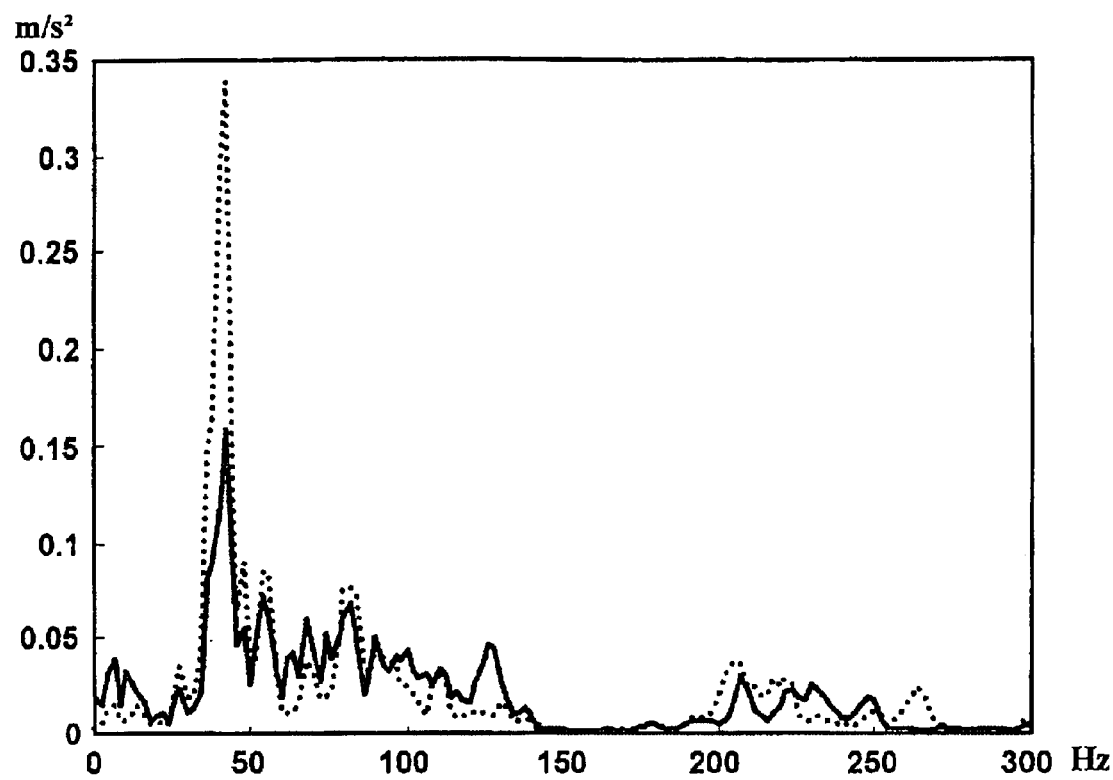
FIG. 4 shows a comparison between the accelerations perpendicular to the plane of the testing drum, obtained using the model according to the invention and by measuring with the test mounted assembly corresponding to that of FIGS. 2 and 3.

FIG. 4 shows in a solid line the spectrum of accelerations recorded at the steering wheel in a direction perpendicular to the plane of the said steering wheel, and in a dotted line the spectrum of the same accelerations as forecast by the model according to the invention, at a speed of 90 km/h.

Figure 5:
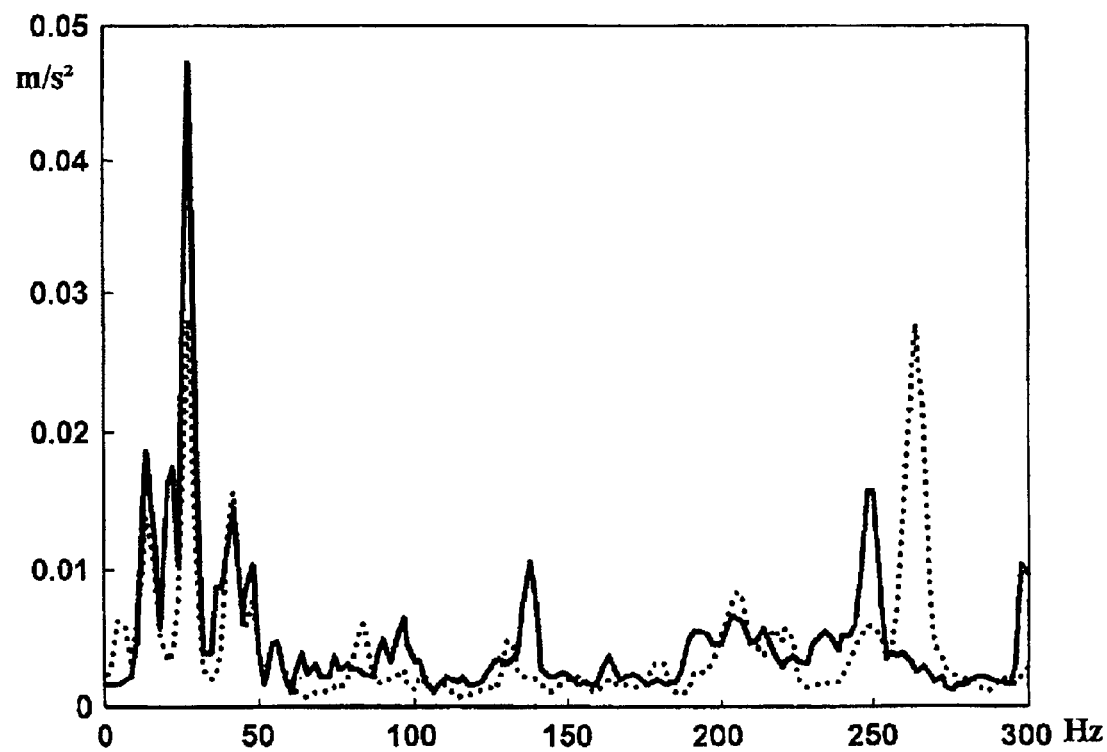
FIG. 5 shows a comparison between the accelerations perpendicular to the floor of the vehicle, obtained using the model according to the invention and by measuring with the test mounted assembly corresponding to that of FIGS. 2 and 3.

FIG. 5 shows in a solid line the spectrum of accelerations recorded at the floor in a direction perpendicular to the said floor, and in a dotted line the spectrum of the same accelerations as forecast by the model according to the invention, at a speed of 90 km/h.

It will be seen from examining these figures that the level of forecasting is satisfactory.

Using the method according to the invention, it is consequently easy to forecast the comfort performance connected with the non-uniformities of as many mounted assemblies as are wished once the overall transfer function has been determined by the method described on a vehicle with a reference mounted assembly. The cost of this forecasting will be equal to the cost fixed for measurement at a wheel center for each mounted assembly. The advantage of this method for use with a mounted assembly on a prototype vehicle which can only be available for a brief period will thus be clearly seen.

Thanks to the method according to the invention, we can envisage the possibility of an exchange of data between a tire manufacturer and a vehicle constructor without the manufacturer having to have the vehicle available, since the constructor of the said vehicle will take care of performing the test on the vehicle and then providing the overall transfer function of the said vehicle to the manufacturer.

The method described here is applicable to various types of vehicles (private cars, commercial vans and heavy goods vehicles). The travel carried out on a testing drum may be replaced by travel on a roller bench or indeed on a travel machine of the flat track type. Finally, some experimental steps of the method may be partially or entirely replaced by appropriate digital simulations.

What is claimed is:

1. A method of forecasting the comfort performance in a vehicle equipped with a test mounted assembly in a elected position, this assembly comprising a tire mounted on a mounting wheel having seats and edges against which tire beads are supported, the said vehicle travelling at a given speed V on a travel medium of the smooth ground type, allowing an equivalent maximum speed Vmax of the vehicle to be attained, Vmax being greater than the given speed V, this method comprising the following steps:

(a)—preparing a reference mounted assembly comprising a tire and it mounting wheel, such that this reference mounted assembly of circumferential length $\pi D$ has N irregularities which are substantially identical and regularly distributed over the circumference of the mounted assembly, these irregularities being selected to excite the vehicle in a range of frequencies from a minimum frequency Fmin to a maximum frequency Fmax in the course of travel over smooth ground, the number N being determined by the formula:

$$N = \text{integer part}\left(\frac{(F\max \times \pi D)}{V\max}\right) + 1$$

where: Fmax is in hertz, D is in meters and Vmax is in meters per second;

(b)—equipping the vehicle with the reference mourned assembly in the selected position on the vehicle;

(c)—positioning the vehicle such that the reference mounted assembly rests on the travel medium capable of causing the said reference mounted assembly to rotate;

(d)—recording the noise and vibrations at at least one point inside the vehicle by working through the speeds of rotation of the reference mounted assembly in a range of speeds of rotation equivalent to the speeds Vmin, Vmax, of the vehicle, the speed Vmin being defined by the following equation:

$$V\min = \frac{(F\min \times \pi D)}{N}$$

(e)—measuring the resulting forces exerted at the wheel center of the reference mounted assembly, this assembly being mounted to travel either on the travel medium used in step (c) or on a travel medium equivalent to that used in step (c) and put under the conditions of travel corresponding to the position selected on the vehicle;

(f)—calculating for this position on the vehicle an overall transfer function between the forces measured at the wheel center of the reference mounted assembly and the noise and vibrations in the vehicle;

(g)—measuring the resulting forces at the wheel center of the test mounted assembly travelling on the travel medium from step (c) or on a travel medium equivalent to that used in step (c), under conditions of tire pressure and load identical to those used in step (c) at a speed of rotation equivalent to the speed V;

(h)—multiplying the forces obtained in step (g) by the overall transfer function calculated in step (f) to obtain a forecast of the noise and vibrations in the vehicle travelling at speed V, the said vehicle being equipped with the test mounted assembly in the selected position.

2. The method of forecasting according to claim 1 wherein the reference mounted assembly comprises a tread whereof the outer surface forms a tread surface on which all the irregularities are located.

3. The method of forecasting according to claim 2 wherein all the irregularities comprise a series of notches made transversely on the tread and forming an angle of at most 30° with the transverse direction.

4. The method of forecasting according to claim 3 wherein the notches have a mean width Le and are disposed regularly in the circumferential direction at a mean pitch P, the relationship between the mean width Le and the pitch P being determine by the equation:

$$0.05 \le \frac{Le}{P-Le} \le 5$$

5. The method of forecasting according to claim 2 wherein all the irregularities comprise a series of over-thick portions made transversely on the tread and forming an angle of at most 30° with the transverse direction.

6. The method of forecasting according to claim 1 wherein them measurements are made during a test of uniform deceleration between the maximum speed Vmax and the minimum speed Vmin.

7. The method of forecasting according to claim 1 wherein in order to make measurements at a minimum frequency (Fmin) which is small or zero, an irregularity of mass is added to the reference mounted assembly.

8. The method of forecasting according to claim 1 wherein the irregularities are created by placing N insert blocks of appropriate dimensions distributed regularly between at least one of the tire beads and its mounting wheel in order to bring the said beads into closer proximity in the axial direction.

9. The method of forecasting according to claim 1 wherein the irregularities are created by placing N insert blocks of appropriate dimensions distributed regularly between at least one of the tire beads and the seat of its mounting wheel.

10. The method of forecasting according to claim 1 wherein, the tire comprising sidewalls connecting the beads of the tire to the tread, the irregularities are created by placing N insert blocks of appropriate dimensions distributed regularly between at least one of the tire beads and the seal of its mounting wheel.

* * * * *